Feb. 19, 1963  E. H. VICKERY  3,077,902
PROTECTED BALL VALVE SEAL
Filed June 30, 1960  3 Sheets-Sheet 1

INVENTOR.
EDGAR HERBERT VICKERY
BY Lothrop & West
ATTORNEYS

Feb. 19, 1963 E. H. VICKERY 3,077,902
PROTECTED BALL VALVE SEAL
Filed June 30, 1960
3 Sheets-Sheet 2

INVENTOR.
EDGAR HERBERT VICKERY
BY Lothrop & West
ATTORNEYS.

3,077,902
PROTECTED BALL VALVE SEAL
Edgar Herbert Vickery, Oakland, Calif., assignor to Fisher Governor Company, Marshalltown, Iowa, a corporation of Iowa
Filed June 30, 1960, Ser. No. 39,846
4 Claims. (Cl. 137—625.12)

My invention relates to ball valves which usually comprise a housing within which a valve ball is mounted for rotation, the ball being provided with a through or flow passageway in it for establishing communication between the inlet and the outlet of the valve in one position of the ball and for blocking flow between the inlet and the outlet in another position of the ball. A device of this general sort is shown in my copending application entitled "Ball Valve," Serial No. 614,842, filed October 9, 1956, now abandoned. In that device, there is provided a seal for assisting in keeping the material being controlled, either liquid or gas or both, from flowing through the valve when the valve is in closed position. While in some environments minor or leakage flow is unimportant, in other environments it is essential that the valve when closed be drop-tight in the case of liquids and bubble tight in the case of gases. Tight closure is required in the control of materials presently considered exotic such as liquid oxygen, nitrogen and other similar fluids, particularly when the pressures involved are high, for example, in the range from 5,000 to 15,000 pounds per square inch, or when the temperatures are extreme, for example, from minus 420 degrees F. to plus 500 degrees F. In practice, various combinations of pressure and temperature are encountered and the values given are illustrative of present conditions rather than absolute limits.

In these and comparable environments and particularly when the valve is utilized not simply as a full flow and a shutoff valve but is also utilized between the full flow position and the shutoff position as a throttling valve, the seal is highly important and is subjected to a great deal of severe service and even abuse.

It is therefore an object of my invention to provide a ball valve in which the seal is not only initially effective but is additionally protected so that its life will be substantially longer than heretofore and so that its sealing effect will be protracted.

Another object of the invention is to provide in a ball valve a seal construction involving not only a protected seal but also a preliminary seal to share part of the sealing function.

Another object of the invention is to provide a protected seal for a ball valve.

Another object of the invention is to provide in a ball valve a seal mechanism which does not permit measurable leakage when the valve is closed yet does not imposed a severe frictional or turning load on the valve ball.

A still further object of the invention is to provide a protected ball valve seal especially for use in ball valves in which there is extensive throttling action.

Other objects, together with the foregoing, are attained in the forms of the invention described in the accompanying description and illustrated in the accompanying drawings, in which.

Figure 1:
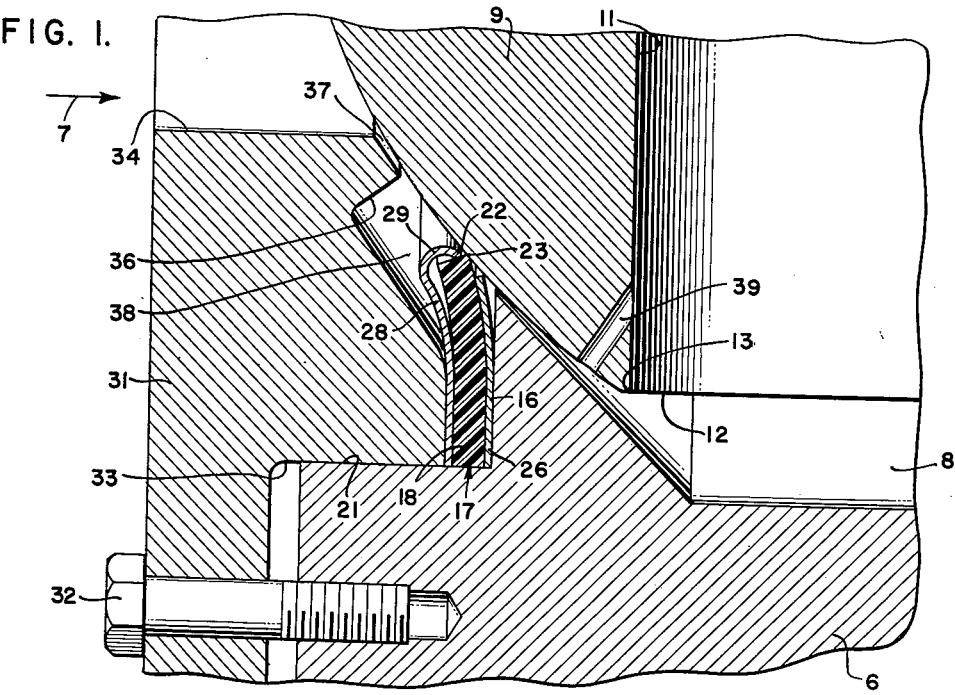
FIGURE 1 is a detail in cross section on an axial plane through one portion of a protected ball valve seal pursuant to the invention, the valve ball being illustrated in closed position.
Figure 2:
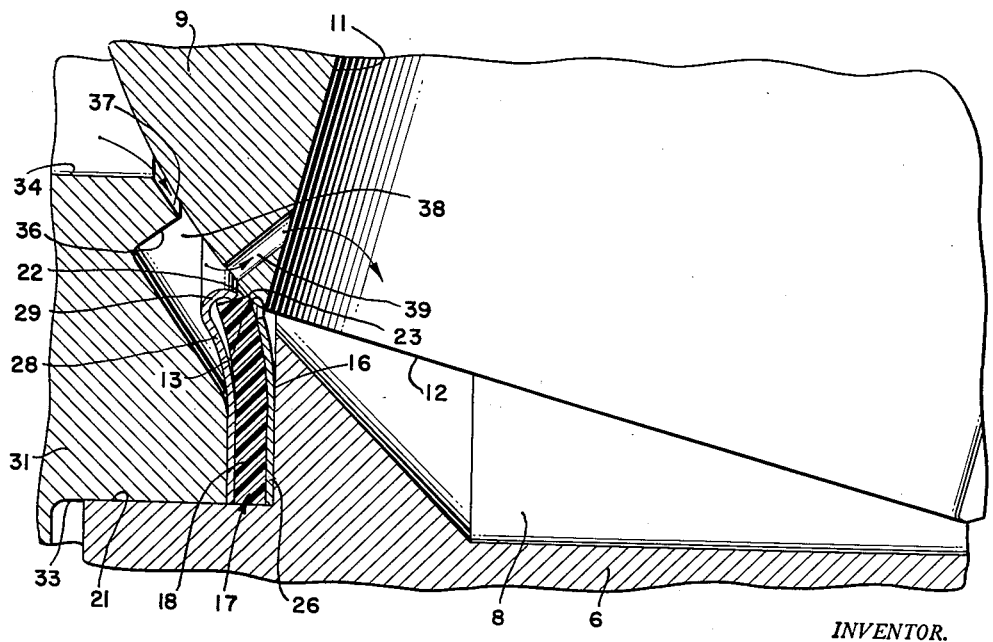
FIGURE 2 is a view similar to FIGURE 1, but showing the valve ball in an intermediate, opening position.
Figure 3:
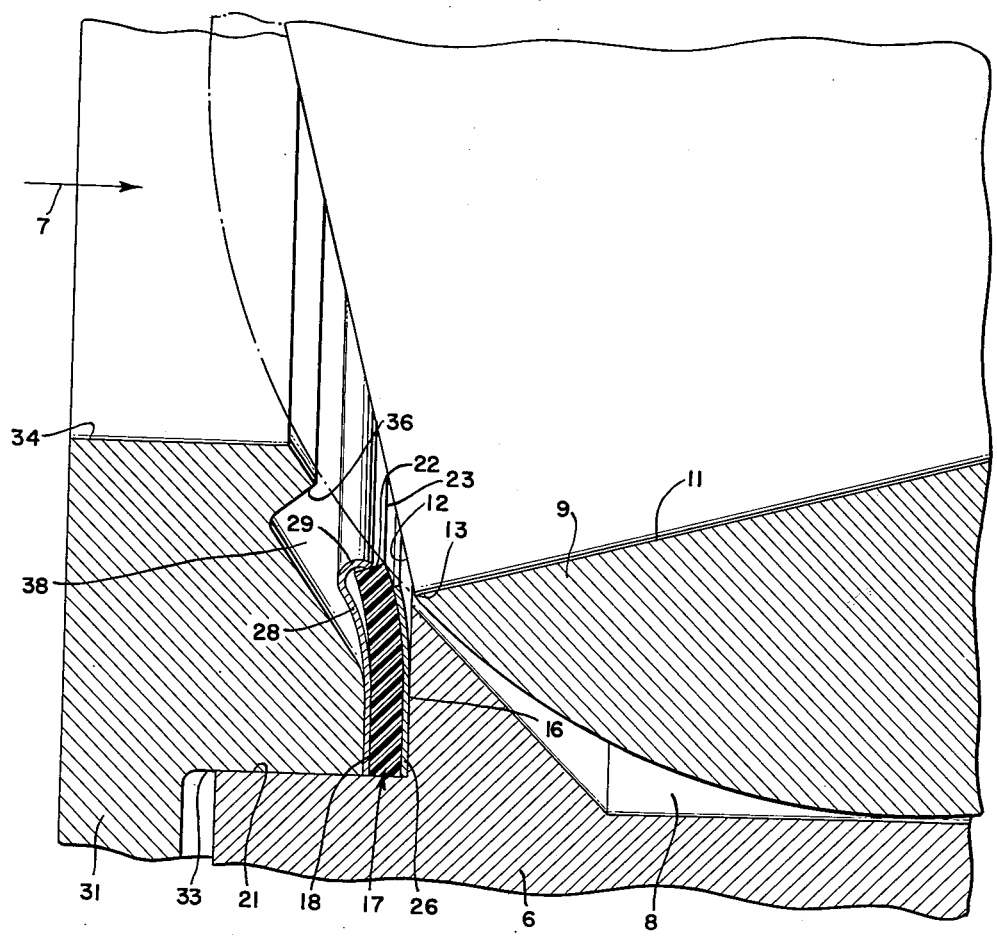
FIGURE 3 is a view similar to FIGURES 1 and 2, but showing the valve ball in nearly open position.

The protected ball valve seal pursuant to this invention can be provided in a large number of different ways and in general is incorporated in a ball valve generally constructed as shown in my above-identified application. The mechanism in the present instance, as shown in FIGURES 1 to 3, inclusive, includes a main housing 6 of the customary sort through which flow can proceed in the direction of the arrow 7 from the inlet or upstream side, which is on the left in FIGURE 1, toward the outlet or downstream side. The housing 6 is preferably formed with an interior cavity 8 approximately following the contour of a ball 9 mounted within the housing 6 on trunnions or bearings (not shown) to rotate about an axis extending in a direction transversely of the flow arrow 7. The ball 9 has a flow passage 11 therethrough usually of circular cylindrical formation so that the passage 11 merges with the surface of the ball 9 in an approximate circle 12 of a predetermined diameter. The junction of the passage 11 and the ball surface is usually formed with a rounded contour 13 or minor radius, although the intersection can still be considered as a circle of a known diameter.

Preferably, the housing 6 not only accommodates the ball 9 for rotation but also is formed to provide an abutment 16 or shoulder to serve as a support for a main seal, generally designated 17. The seal is conveniently fabricated of an originally or initially flat annulus 18 of suitable deformable material such as "Kel-F" or the like and is of an outer diameter to fit easily within a bore 21 in the housing 6. The annulus 18 is conveniently circular cylindrical on its outer diameter and is also originally circular cylindrical on its inner diameter to provide an inner surface 22 of a diameter greater than that of the passage 11 but substantially less than that of the ball 9. When installed and deformed by being pressed against the ball, as shown in FIGURE 1, the originally circular cylindrical surface 22 is distorted into a frustoconical contour and leaves an edge 23, or corner. This edge is held in abutment with or forced against the ball 9 by reason of the force due to the deformation of the previously flat annulus 18 toward the inlet or upstream side of the valve. A seal of this type is disclosed in my above-identified application.

In the present instance, the deformable annulus 18 is augmented and supplemented by additional devices. Interposed between the annulus 18 and the shoulder 16 of the housing 6 is a metal support disc 26. This is usually made from a flat annulus of relatively thin metal and preferably is given an initial set or deformation prior to installation in the housing 6 to have in cross-section a curvature approximating the cross-sectional curvature of the deformed annulus 18. The support disc 26 either comes into very light contact with the ball 9 or has a slight clearance with respect to the ball. In any event, the disc 26 is so contoured and is of such an interior size that it overlies and supports and protects, in part, the annulus 18. Any part of the disc 26 subject to fluid pressure on both sides is preferably perforated to equalize the fluid pressure.

Additionally, the annulus 18 on its other or upstream side is augmented by a metal protector disc 28 of a similar thickness to the disc 26 and substantially thinner than the annulus 18 itself. The disc 28 is preferably provided with an initial contour or set substantially as shown in FIGURE 1. This approximately follows the deformed cross-sectional curvature of the upstream face of the annulus 18. The disc may have sufficient spring in some portion as to urge the annulus 18 toward the ball 9, although a separate disc (not shown) may be used with the disc 28 for this purpose; i.e., to provide a pre-load at low fluid pressure.

The protector disc 28 in its innermost portion is provided with a reverse curve 29. This may be complete enough to constitute an inner bead curving downstream to overlie a substantial part of the originally circular cylindrical surface 22 of the annulus 18. The protector disc 28 preferably has perforations to equalize fluid pressure on opposite sides. The disc 28 does not substantially displace the edge of annulus 18 which always has its edge 23 in deformed contact with the ball. At the same time, the inner bead 29 on the protecting disc 28 serves not only to overlie and protect most of the originally circular cylindrical inner surface 22 of the annulus 18 but furthermore provides a streamlined or contoured flow shape. Fluid flowing over the seal annulus 18 travels thereover with very little turbulence or disturbance. The protector disc 28 ordinarily does not come into contact with the ball 9 although it may come into light frictional contact therewith. Sometimes the disc 28 is enlarged in thickness particularly adjacent its inner margin so that it presents a relatively stiff inner corner that can operate for protracted periods in contact with the ball 9. In fact, the disc 28 can be made to act very much like the annulus 18 and so to serve as a preliminary or auxiliary seal just upstream of the annulus. The seals then work in cascade. In that event, it is preferable to make the disc 28 and the annulus 18 of the same materials.

The discs 26 and 28 serve to support part of the annulus 18 and to damp out flutter or vibrations therein which may be induced in it by fluid flow thereover. The shape of the discs is such as to minimize eddies in the vicinity of the edge 23 and also is such as to provide relatively quiescent fluid bodies in immediate contact with the innermost portions of the annulus 18 to serve as fluid dampers against flutter or vibration of the seal itself.

Pursuant to the invention, the seal annulus 18 and the discs 26 and 28 are held in position against the shoulder 16 within the housing 6 by means of a removable ring 31 secured by fasteners 32. The ring has a cylindrical portion 33 which is telescoped or piloted into the bore 21. The ring 31 has an interior circular cylindrical bore 34 of a diameter substantially to continue the passageway 11 of the ball when the ball is in open position.

Approximately as disclosed in my copending application entitled "Sealed Ball Valve," filed May 11, 1959, Serial No. 812,309, now Patent No. 3,036,600 granted May 29, 1962, the ring 31 is provided with an intrusive portion 36 so that there is afforded only a very narrow passageway 37 between the ring and the valve ball. The passageway 37 leads to a somewhat enlarged cavity 38 between the portion 36 and the seal annulus 18. The ball 9 has a shunt conduit 39 therethrough. When the valve ball is moved from closed position as shown in FIGURE 2, the initial flow travels through the restricted passage 37 into the cavity 38 and thence through the ball and through the interior of the housing 6. Thus, initial high velocity flow at a great pressure differential is not immediately effective upon the seal annulus 18. When the valve ball is moved still further toward open position substantially as shown in FIGURE 3, the seal annulus 18 is well protected by the discs 26 and 28 against damage by rapid flow thereover. The seal, being protected, can withstand a great deal of flow throttling by the valve in various positions of the valve ball between the FIGURE 2 position and the FIGURE 3 position. In all instances, the otherwise vulnerable portion of the seal annulus 18 is guarded against flutter and deleterious action by turbulent and violent flow thereover. While in most instances there are no abrasives in the flowing fluid itself, the seal protectors are particularly useful when abrasives are present in the fluid. The phenomena of cavitation are greatly reduced by this construction so that the seal annulus 18 has an unexpectedly long life and is effective as a drop-tight closure in the closed position of the valve over a very long period.

Figure 4:
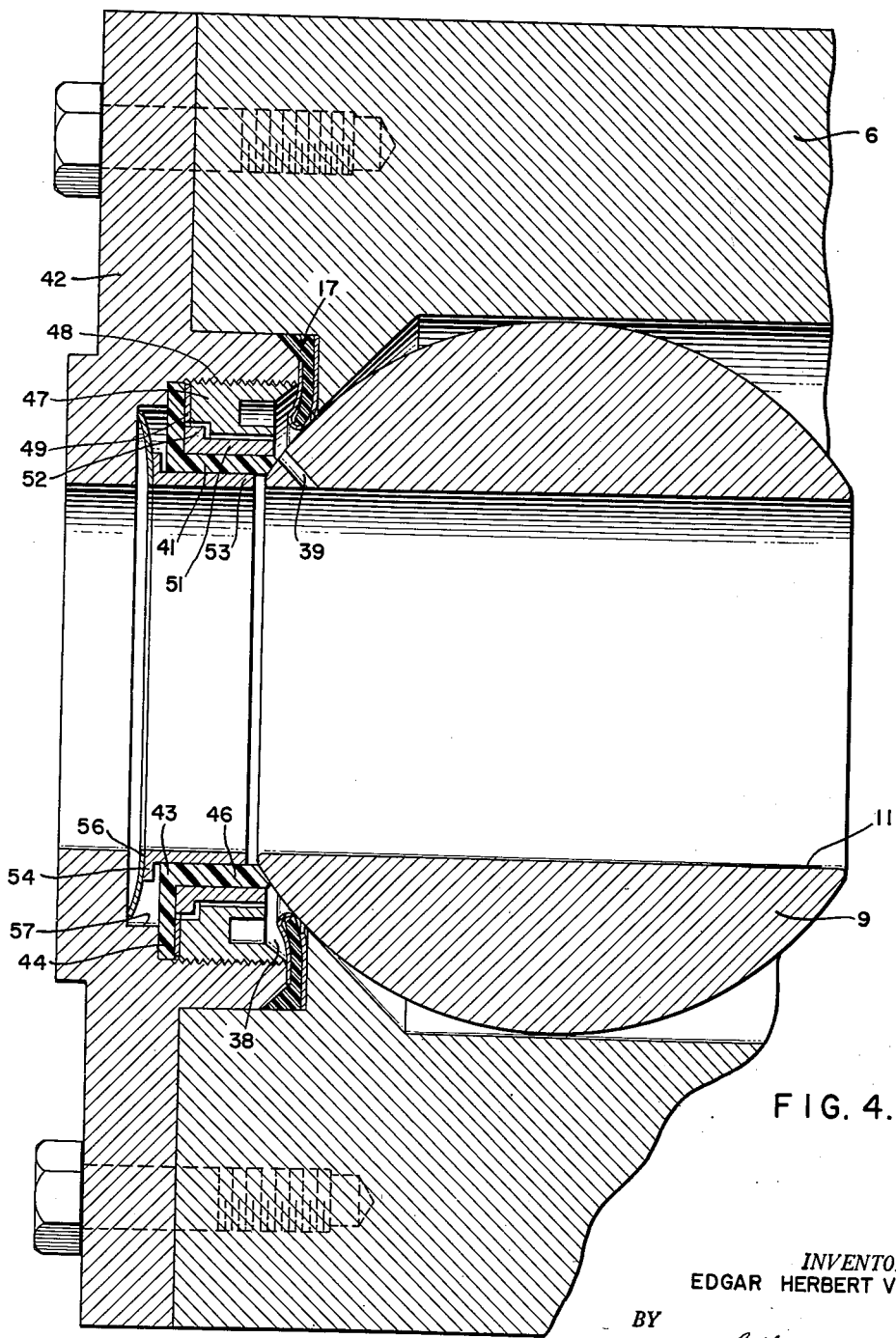
FIGURE 4 is a view comparable to the preceding views, but showing a modified form of protected ball valve seal incorporating a preliminary seal.

In some instances, particularly when there is a great deal of throttling to be done, it is preferred to provide a construction shown in FIGURE 4. For the most part, this corresponds with the construction shown in FIGURES 1, 2 and 3 but there is provided in addition a preliminary seal, generally designated 41. In this case, the ring 42 in most regards is identical with the ring 31 and is similarly disposed in the housing 6. The ring is effective to hold the main seal 17 in position and in addition provides for the preliminary seal 41. In this form of device, the preliminary seal includes a deformable seal member 43 having a generally planar radial portion 44 and an integral circular cylindrical portion 46. The portion 46 extends into contact with the ball 9 and makes contact therewith in a small area or circle of somewhat less diameter than that of the edge 23 of the main seal but still of a diameter somewhat greater than that of the passage 11 through the ball 9. The preliminary seal is held in position in the ring 42 by a nut 47 having a threaded connection 48 with the ring 42 and bearing against a thrust washer 49 so that the seal 41 is firmly clamped in position.

The outer dimension of the cylindrical portion 46 of the seal is kept from expanding unduly, either due to differential fluid pressure or to wedging action against the ball, by a confining ring 51. The confining member 51 has an enlarged shoulder 52 to assist in maintaining the position of the preliminary seal but this shoulder has clearance with respect to the nut 47 so that the confining member 51, in effect, floats axially around the exterior of the circular cylindrical portion of the preliminary seal 41. The ring 51 is effective to prevent radially outward expansion of the preliminary seal over most of its length, although the innermost or downstream tip of the preliminary seal directly in contact with the ball is free to be slightly displaced. The preliminary seal 41 also has support and protection on most of its innermost surface from a band 53, preferably of metal or other stiff material. The band 53 does not quite contact the ball 9 and is of an inner diameter substantially the same as that of the flow passage 11. The band 53 at its upstream end has an enlarged shoulder 54 thereon and this is secured to a flexible disc 56 having its outer extremity loosely lodged within a recess 57 within the ring 42. The band 53 can move axially in a slight amount upon flexing of the disc 56 and serves to prevent undue pressure extrusion of the displaceable material of the seal 43. If the band 53 should be displaced enough to contact the ball 9, no harm is done since the band is usually made of very soft metal or comparable low friction material and can readily yield axially in the event motion of the ball requires it.

The operation of the seal of FIGURE 4 is substantially the same as that of the seals shown in the other figures because the cavity 38 remains. However, there is a much smaller leakage pathway between the housing and the ball. Instead of a plain clearance or passageway 37 between the ball and the ring portion of the housing, the preliminary seal affords only a minute flow area. The preliminary seal is not intended as a droptight seal and is not intended to replace the seal provided by the flat annulus 18 but is intended to afford a very small leakage flow passage between the inlet to the valve and the cavity 38 and to have a preliminary wiping effect on the ball.

In both forms of device, when the ring 31 is removed the seal 17 can readily be removed and replaced if necessary and after the ring has been removed in the FIGURE 4 construction, removal of the nut 47 permits ready extraction of the preliminary seal and all of its appurtenances.

What is claimed is:

1. A sealed ball valve comprising a housing having an inlet, an outlet, and a flow path therethrough communicating said inlet and said outlet; a valve ball having a flow passage therethrough and rotatably mounted in said housing about an axis transverse to said flow path; said housing having an abutment therein adjacent the inlet, said abutment being spaced from said ball; a valve seal comprising a flat deformable annulus having an inner substantially cylindrical surface of a diameter greater than that of said flow passage and substantially smaller than that of said ball with said cylindrical surface being subjected to variable pressures responsive to turbulent flow past said cylindrical surface, said annulus being mounted so that an inner edge thereof bears against the upstream side of said ball; a flat metal support disc interposed between said annulus and said abutment in said housing and extending on the downstream side of said annulus toward said ball but with running clearance therebetween; a flat metal protector disc disposed against the upstream side of said annulus and having an internal flange extending downstream and overlying a substantial part of said inner cylindrical surface to protect said surface from the effects of said turbulent flow; means for holding said protector discs and said annulus in said housing in side-by-side abutting relationship against the abutment therein; and means clampingly securing said holding means to said housing to flex said annulus into edge sealing relationship with the upstream side of said ball.

2. A sealed ball valve comprising a housing having a flow path therethrough; a valve ball having a flow passage therethrough and rotatably mounted in said housing about an axis transverse to said flow path; a valve seal comprising a flat deformable annulus having an inner substantially cylindrical surface of a diameter greater than that of said flow passage and substantially smaller than that of said valve ball; means in the housing for abutting the downstream side of the annulus substantially along the side thereof and being of a length permitting an inner edge of the annulus to engage the upstream side of said ball, means in the housing for abutting the upstream side of the annulus substantially along the side thereof; an annular ring for mounting said valve seal in said housing; means for securing said annular ring to the housing with the inner portion of said annulus deformed in an upstream direction and with an inner edge of said annulus sealingly engaging said valve ball along a circle on the upstream side of the valve ball by the force resulting from the deformation of said annulus; an annular preliminary seal of deformable material extending from said annular ring in a downstream direction for sealingly engaging said valve ball along a circle of lesser diameter than said inner substantially cylindrical surface of said annulus; and means for floatingly holding said preliminary seal in said annular ring whereby said preliminary seal is adapted to move transverse to the axis of the flow passage.

3. A sealed ball valve as in claim 2 including means in said valve ball forming a path of fluid flow between said flow passage and said housing intermediate said annulus and said preliminary seal in one rotated position of said ball in said housing.

4. A ball valve as defined in claim 1 including means in said housing and engaging said ball at a location spaced upstream of said annulus for forming a preliminary seal between said housing and said ball, said means including means for enabling said preliminary seal to be floatingly engaged against said ball.

References Cited in the file of this patent
UNITED STATES PATENTS

| | | |
|---|---|---|
| 934,614 | Huxley | Sept. 21, 1909 |
| 2,383,983 | Melichar | Sept. 4, 1945 |
| 2,497,448 | Grosboll | Feb. 14, 1950 |
| 2,516,947 | Blevans | Aug. 1, 1950 |
| 2,547,116 | Gould | Apr. 3, 1951 |
| 2,762,601 | Clade | Sept. 11, 1956 |
| 2,845,247 | Housekeeper | July 29, 1958 |
| 2,853,269 | Shand | Sept. 23, 1958 |
| 2,942,840 | Clade | June 28, 1960 |